J. Woodrough,
Saw Teeth.
N° 54,827.        Patented May 15, 1866.
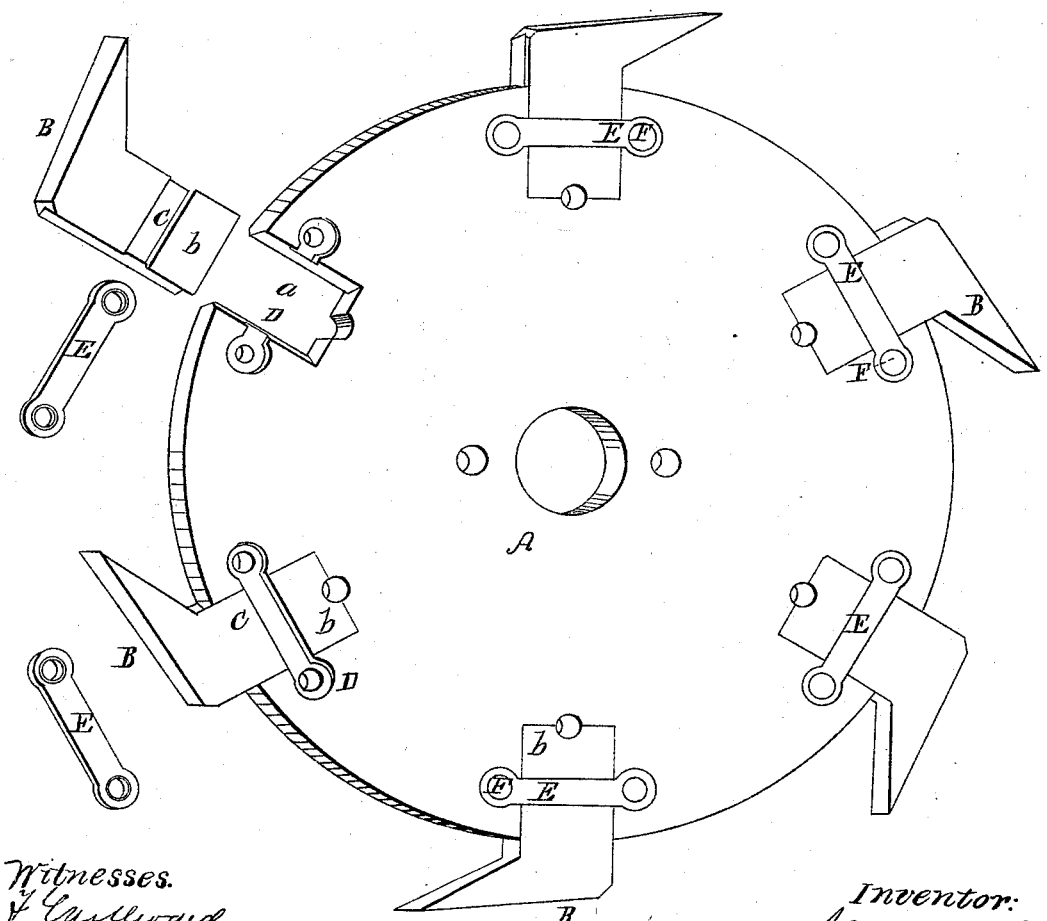
Witnesses.
Y Caldwell
James H. Layman
Inventor:
J. Woodrough
By Knight Brothers
attorneys

UNITED STATES PATENT OFFICE.

JOSEPH WOODROUGH, OF CINCINNATI, ASSIGNOR TO WOODROUGH & McPARLIN, OF CINCINNATI, OHIO.

IMPROVEMENT IN SAWS.

Specification forming part of Letters Patent No. 54,827, dated May 15, 1866.

*To all whom it may concern:*

Be it known that I, JOSEPH WOODROUGH, of Cincinnati, Hamilton county, State of Ohio, have invented a certain new and useful Improvement in Circular Saws; and I do hereby declare the following to be a full, clear, and exact description thereof, reference being had to the accompanying drawing, making part of this specification.

My invention relates to saws constructed with false or inserted teeth; and it consists in a peculiar device for securing the same against any but intentional displacement.

The accompanying drawing represents, by perspective view, a saw with teeth constructed and secured by my improved device.

The shanks $b$ of the teeth B have parallel sides, as shown, and are fitted into suitable slots $a$ of the saw-plate A. The edges of the saw-plate at the side of the slots and the edges of the shanks $b$ are V-shaped outward and inward respectively, and fitted so accurately together that when the shanks are driven into the slots the teeth are perfectly secure from lateral displacement.

The teeth are secured against radial displacement by the following device: Depressions C are cut across the faces of the shanks $b$, and continuations D of the same depression are cut in the saw-plate at each side of the slots, the whole being adapted to receive and completely embed a peculiarly-formed gib, E. The gibs are secured at the ends by rivets F passing through the saw and riveted at both ends. In order to remove any particular tooth it is merely necessary to detach its gib, when the tooth may be started loose by the application of a spike or wedge at the aperture $a'$.

I claim herein as new and of my invention—

The countersunk or embedded gibs E, employed in combination with the teeth B C, substantially as and for the purpose set forth.

In testimony of which invention I hereunto set my hand.

JOSEPH WOODROUGH.

Witnesses:
GEO. H. KNIGHT,
M. MCPARLIN.